Aug. 13, 1957  P. J. WESTFALL  2,802,539
FOUR WHEEL DRIVE TRACTOR
Filed April 23, 1954  3 Sheets-Sheet 1

Paul J. Westfall
INVENTOR.

Aug. 13, 1957     P. J. WESTFALL     2,802,539
FOUR WHEEL DRIVE TRACTOR

Filed April 23, 1954     3 Sheets-Sheet 2

Paul J. Westfall
INVENTOR.

BY *[signatures]*
Attorneys

Aug. 13, 1957     P. J. WESTFALL     2,802,539
FOUR WHEEL DRIVE TRACTOR
Filed April 23, 1954     3 Sheets-Sheet 3
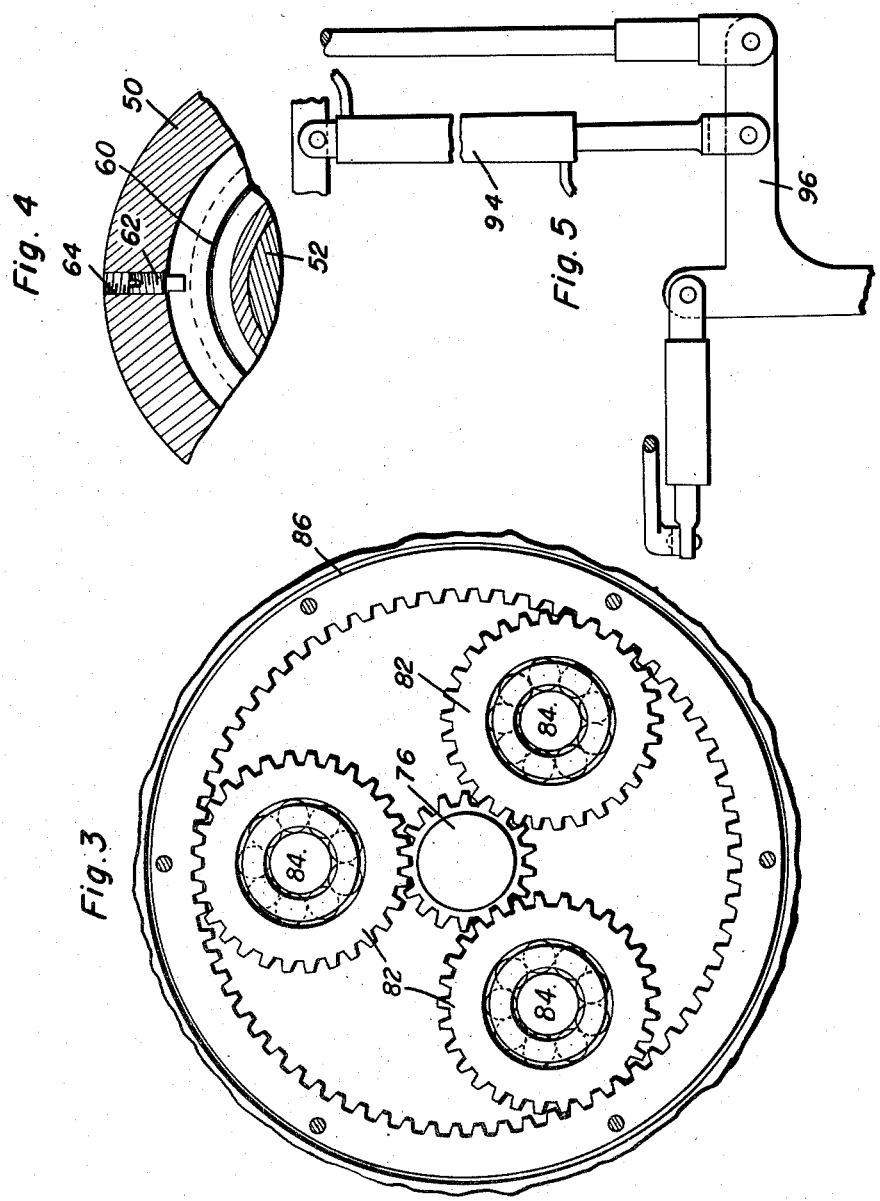
Paul J. Westfall
INVENTOR.

United States Patent Office 2,802,539
Patented Aug. 13, 1957

2,802,539

FOUR WHEEL DRIVE TRACTOR

Paul J. Westfall, Portland, Oreg.

Application April 23, 1954, Serial No. 425,174

1 Claim. (Cl. 180—47)

This invention relates to a four wheel drive tractor and more specifically provides an improved drive means for a tractor including a novel and improved power transmitting means to the rear and front wheels and an improved means for permitting pivotal movement of the front wheels for guiding the tractor.

An object of this invention is to provide a four wheel drive tractor utilizing a chain drive for the forward wheel wherein the chain passes over sprocket arrangements giving the chain a relatively high lineal speed wherein a smaller chain may be used for transmitting a given amount of power.

A further object of this invention is to provide a four wheel drive tractor having a sprocket and chain drive for the front wheels and a universal joint for permitting pivotal movement of the front wheels for steering and positioning the universal joint coincidental with the pivot joint thereby supporting the weight of the tractor with no overhang to steer against.

Still another object of this invention is to provide a four wheel drive tractor having all of the wheels turning at the same speed and utilizing a planetary gear system for driving the front wheels from a front power shaft.

A still further important feature of the present invention is to provide a four wheel drive tractor that is efficient in operation, easy to utilize, long lasting, inexpensive to maintain and especially useful in logging or earth-moving or similar heavy-duty work.

These together with other objects and advantages which will become subsequently apparent reside in the details of construction and operation as more fully hereinafter described and claimed, reference being had to the accompanying drawings forming a part hereof, wherein like numerals refers to like parts throughout, and in which:

Figure 3 is an end view showing the planetary gear system for driving each front wheel from a stub axle;

Figure 4 is a detailed section taken substantially along section line 4—4 of Figure 2 showing the bearing retaining set screws for holding the stub axle in its sleeve; and Figure 5 is a top plan view showing the steering mechanism for guiding the front wheel.

Figure 1:
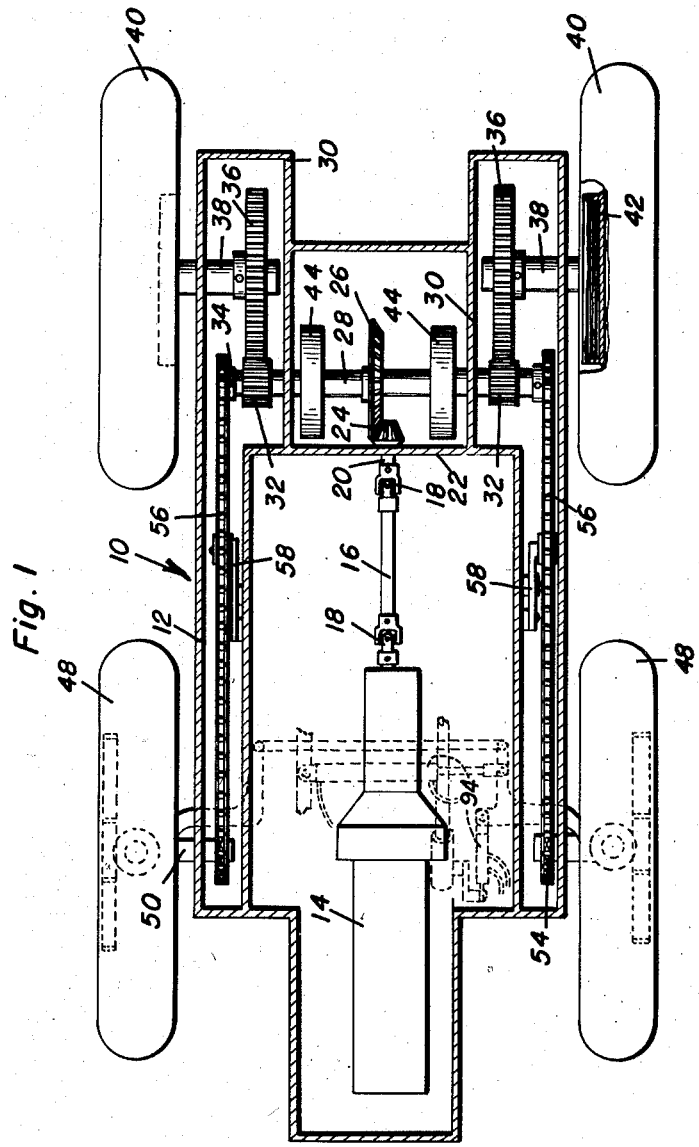
Figure 1 is a top plan view of the tractor with the frame portion broken away showing the four wheel drive of the present invention.

Referring now specifically to the drawings, it will be seen that the numeral 10 generally designates the four wheel drive tractor of the present invention. The tractor 10 includes a frame 12 having a suitable motor 14 mounted thereon wherein the motor 14 may be of any conventional internal combustion type utilized in tractors or similar equipment. Extending rearwardly of the motor 14 is a power drive shaft 16 having a universal joint 18 at each end thereof. A shaft 20 is rotatably journalled in a rear portion 22 of the frame 12 and a bevel pinion gear 24 is secured to the outer remote end of the shaft 20 for meshing engagement with a bevelled ring gear 26 secured to a transverse shaft 28. The shaft 28 is generally perpendicular to the drive shaft 16 and the bevelled gears 24 and 26 transmit the power from the drive shaft 16 to the transverse drive shaft 28. The transverse shaft 28 is journalled in rearwardly extending portion 30 of the frame 12 and a pinion spur gear 32 is secured to the shaft 28 adjacent each remote end thereof and a sprocket gear 34 is secured at each remote end of the transverse shaft 28 exteriorly of the spur pinion gear 32. A bull gear 36 is secured to a rear stub axle 38 for meshing engagement with the pinion 32 for driving rear wheels 40. Suitable brakes of the disk-type 42 are provided on each rear wheel 40 for determining the speed and stopping the tractor 10. Suitable clutch means 44 is provided on the transverse shaft 28 for controlling the power transmitted to each of the pinions 32 thereby controlling the operation of the tractor 12.

A pair of pivotally mounted front wheels 48 are secured to the forward portion of the frame 12 for guiding the tractor 10 and the wheels 48 are mounted on a housing 50 projecting from each side of the frame 12. The housing 50 rotatably journals a stub axle 52 therein and the stub axle 52 has a sprocket gear 54 on its inner end in alignment with the sprocket 34 for receiving an endless sprocket chain 56 therearound. A chain tightener 58 is positioned adjacent each side of the frame 12 for engaging and tensioning the sprocket chain 56. It will be seen that by the specific arrangement of the sprocket gears being positioned on the transverse shaft 28 and the stub axle 52, the lineal speed of the sprocket chain 56 is relatively high thereby permitting the use of a relatively small chain for transmitting power from the transverse shaft 28 to the front wheel 48 for driving the front wheels 48.

Figure 2:
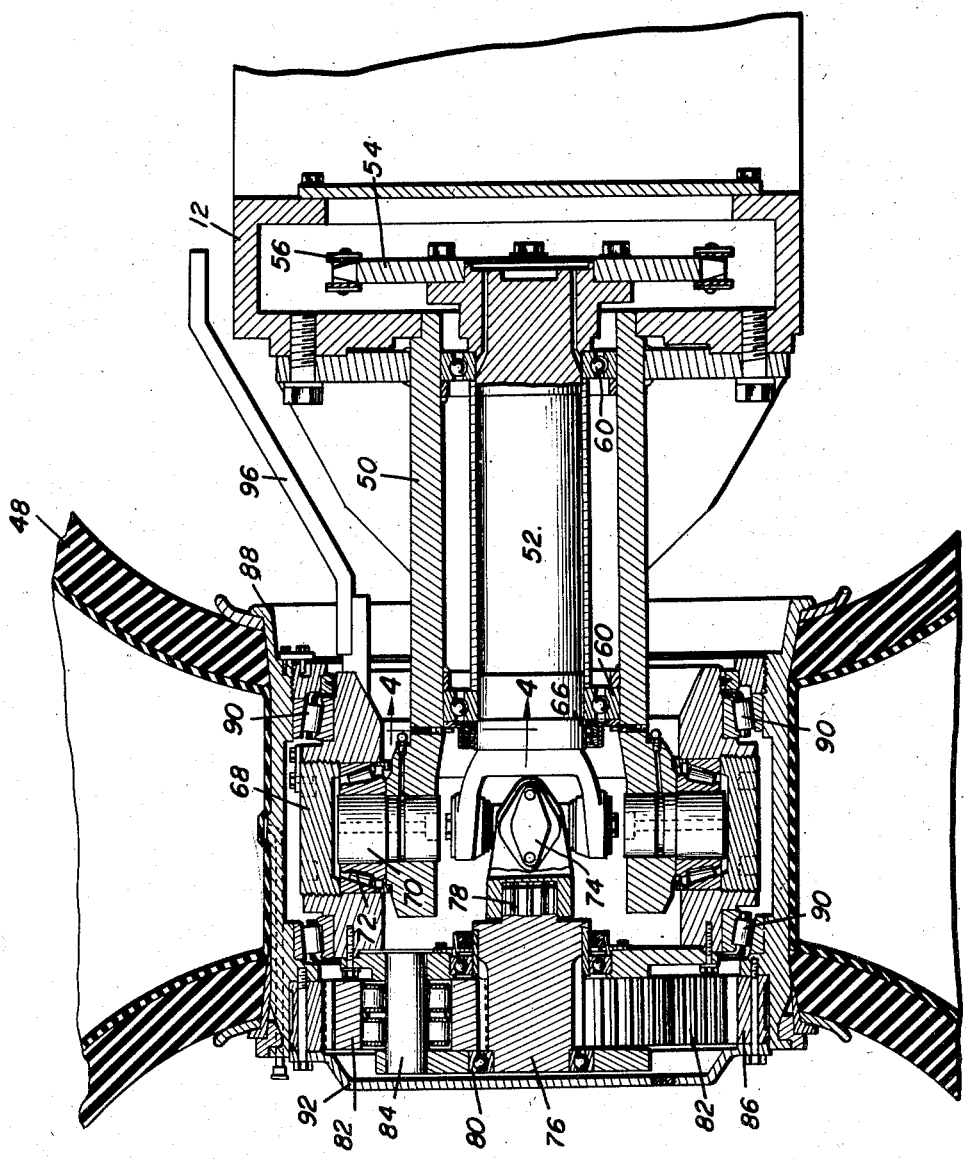
Figure 2 is a detailed section showing the construction of one of the front wheel drive mechanism.

Referring now specifically to Figure 2, it will be seen that the stub axle 52 is journalled in suitable bearings 60 in each end of the housing 50 and as specifically shown in Figure 4, the bearings 60 and the stub axle 52 are retained in the housing 50 by a pair of screw-threaded set screws 62 positioned in suitable threaded bores 64 for retaining the members in assembled relation. A suitable grease seal 66 is provided and the outer end of the housing 50 is pivotally attached to a hub member 68 through a pair of vertically disposed pivot pins 70. The hub 68 is pivotally mounted on the pin 70 through the use of suitable roller bearings 72. A universal joint 74 is secured to the outer end of the stub axle 52 and the axes of movement of the universal connection 74 lie in substantially the same plane as the vertical pivotal axis of the hub 68. A sun gear 76 is detachably secured to the universal connection 74 by a splined connection 78 and the sun gear 76 is journalled in suitable bearings 80 in an obvious manner. The sun gear 76 is in meshing engagement with three equally spaced planet gears 82 which rotate on fixed pins 84 secured to the hub 68. The planet gears 82 are in meshing engagement with a ring gear 86 which is secured to the rim 88 of the front wheels 48. The rim 88 of the wheel 48 is rotatably journalled on the hub 68 by suitable bearing members 90 which are of the double row roller bearings with the rows forming a double-conical bearing surface thereby retaining the rim 88 in correct relation to the hub 68 thereby permitting relative rotation between the rim 88 and the hub 68 about an axis defined by the center line of the stub axle 52. Obviously, various grease seals and grease fittings as well as bearings and fastening bolts are provided as may become desirable and necessary. It also will be seen that a suitable cover plate 92 is provided on the outer surface of the rim 88 for sealing the interior of the planetary system which drives each of the front wheels 48. It will be seen in Figure 5 that a suitable power system mechanism 94 is provided for pivoting each of the control arms 96 which moves the hub 68 about the vertical axis formed by the vertical pin 70. Obviously, the device may be utilized with a mechanical linkage if desired.

In operation, it will be understood that power is transmitted to the transverse shaft 28 and then to each of the rear wheels 40 and the front wheels 48. Due to the high lineal speed of the sprocket chain 56, a relatively small chain may be used for transmitting a relatively large load and the relation between the sun gear 76, the planet gears 82 and the ring gear 86 is calculated to give the front wheel 48 the same speed as the rear wheel 40 due to the reduction gearing formed by the pinion 32 and the large bull gears 36. Due to the coincidence of th axes of the universal joint and the vertical pin 70, it will be seen that no weight overhangs thereby greatly reducing the steering force of the tractor. Obviously, the tractor of the present invention may be utilized for a various number of purposes and it is especially useful in heavy-duty work such as logging and earth-moving.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A tractor comprising a frame, a pair of rear wheels and a pair of forward wheels mounted on said frame, power means supported on said frame, a transverse drive shaft rotatably supported on said frame, means interconnecting the power means and the drive shaft for rotating said drive shaft, a stub axle mounting each rear wheel on the frame, an enlarged gear on the inner end of each stub axle, said drive shaft having a pair of relatively small gears mounted thereon in meshing engagement with the enlarged gears on the stub axles, thereby driving the stub axles and the rear wheels at a speed less than the speed of the drive shaft, a front stub axle mounting each forward wheel, each front stub axle having a sprocket gear on the inner end thereof, said drive shaft having a sprocket gear on each end thereof in alignment with the sprocket gears on the front stub axles, a sprocket chain encircling each pair of aligned sprocket gears, said sprocket gears being substantially equal in size for rotating the front stub axles at substantially the same speed as the drive shaft and providing a relatively high sprocket chain linear speed, a hollow housing for each of said front stub axles with the housings being rigidly mounted on said frame, each of said forward wheels including a hub pivotally mounted on each of said hollow housings for movement about substantially a vertical axis, a rim rotatably mounted on said hub, a ground engaging member mounted on said rim, means connected to said hubs for pivoting the same about the vertical axes for steering the front wheels, each of said rims having an internal ring gear thereon disposed exteriorly of the vertical axes, a plurality of idler gears mounted on said hub in meshing engagement with the ring gear, each of said front stub axles having a universal coupling on the outer end thereof with the axes thereof lying in the same plane as the vertical axis of the hub, a central gear in meshing engagement with the idler gears, and a detachable spline connection between the central gear and the universal coupling, the central gear being smaller than the idler and ring gears for reducing the rotational speed of the forward wheels for driving the forward wheels at the same speed as the rear wheels.

References Cited in the file of this patent

UNITED STATES PATENTS

| | | |
|---|---|---|
| 877,293 | Catel | Jan. 21, 1908 |
| 1,314,093 | Pifer | Aug. 26, 1919 |
| 1,648,753 | Bittner | Nov. 8, 1927 |
| 2,187,658 | Lane et al. | Jan. 16, 1940 |
| 2,659,246 | Norelius | Nov. 17, 1953 |

FOREIGN PATENTS

| | | |
|---|---|---|
| 1,036,589 | France | Apr. 29, 1953 |
| 8,553 of 1905 | Great Britain | Apr. 20, 1905 |